(12) United States Patent
de Groot (10) Patent No.: US 10,737,416 B2
(45) Date of Patent: Aug. 11, 2020

(54) METHOD OF MANUFACTURING A SANDWICH PANEL HAVING AN ASYMMETRICAL CONFIGURATION IN THICKNESS DIRECTION

(71) Applicant: FITS HOLDING B.V., Driebergen (NL)

(72) Inventor: Martin Theodoor de Groot, Driebergen (NL)

(73) Assignee: FITS HOLDING B.V., Driebergen (NL)

( * ) Notice: Subject to any disclaimer, the term of this patent is extended or adjusted under 35 U.S.C. 154(b) by 235 days.

(21) Appl. No.: 15/743,086

(22) PCT Filed: Jul. 7, 2016

(86) PCT No.: PCT/NL2016/050489
§ 371 (c)(1),
(2) Date: Jan. 9, 2018

(87) PCT Pub. No.: WO2017/010872
PCT Pub. Date: Jan. 19, 2017

(65) Prior Publication Data
US 2019/0077058 A1    Mar. 14, 2019

(30) Foreign Application Priority Data

Jul. 10, 2015 (NL) .................................. 2015137

(51) Int. Cl.
*B29C 44/12* (2006.01)
*B29C 44/34* (2006.01)
(Continued)

(52) U.S. Cl.
CPC ...... *B29C 44/1228* (2013.01); *B29C 33/3828* (2013.01); *B29C 44/3484* (2013.01);
(Continued)

(58) Field of Classification Search
CPC .............. B29C 44/1228; B29C 44/586; B29C 44/3484; B29C 33/3828; C08J 9/142;
(Continued)

(56) References Cited

U.S. PATENT DOCUMENTS

| 3,743,463 A | 7/1973 | Patrick et al. |
| 2003/0034723 A1* | 2/2003 | Mehan ............... C09J 123/0853 313/318.01 |
| 2014/0088214 A1* | 3/2014 | Okamoto .............. C08L 23/145 521/140 |

FOREIGN PATENT DOCUMENTS

| DE | 1 267 416 B | 5/1968 |
| EP | 0 636 463 A1 | 2/1995 |

(Continued)

OTHER PUBLICATIONS

Kluit "The development of in-situ foamed sandwich panels", Thesis Delft University of Technology, 1997, p. 63 (Year: 1997).*

(Continued)

*Primary Examiner* — Joseph S Del Sole
*Assistant Examiner* — Jamel M Nelson
(74) *Attorney, Agent, or Firm* — Thomas|Horstemeyer, LLP (57) ABSTRACT

The invention relates to a method of manufacturing a sandwich panel having an asymmetrical configuration in the thickness direction. This method comprises the steps of:
a) providing a plate shaped assembly of a first cover part and a second cover part and between a core part of a thermoplastic material containing a suitable blowing agent, wherein the second cover part is not equal to the first cover part regarding heat transfer properties;
b) heating the assembly under pressure between press tools in a press, thereby adhering the foamed core part to the first and second cover parts;

(Continued)

Comparative Example 2 c) foaming of the thermoplastic material in the core part under pressure between press tools in the press and at a foaming temperature by increasing the spacing between the press tools in a controlled manner;
d) cooling the foamed sandwich panel under pressure between the press tools;
e) removing the thus cooled sandwich panel from the press; and optionally
f) drying the sandwich panel;
wherein during step a) a first compensation part conforming to the heat transfer properties of the second cover part is positioned at the side of the first cover part and/or a second compensation part conforming to the heat transfer properties of the first cover part is positioned at the side of the second cover part, and
wherein during or after step e) the first and/or second compensation parts are removed from the sandwich panel.

21 Claims, 4 Drawing Sheets

(51) Int. Cl.
| | |
|---|---|
| *B29C 44/58* | (2006.01) |
| *B29C 33/38* | (2006.01) |
| *C08J 9/14* | (2006.01) |
| *B29K 71/00* | (2006.01) |
| *B29K 79/00* | (2006.01) |
| *B29K 81/00* | (2006.01) |
| *B29L 9/00* | (2006.01) |
| *B29K 9/00* | (2006.01) |

(52) U.S. Cl.
CPC ............ *B29C 44/586* (2013.01); *C08J 9/142* (2013.01); *B29K 2009/00* (2013.01); *B29K 2071/00* (2013.01); *B29K 2079/085* (2013.01); *B29K 2081/06* (2013.01); *B29L 2009/00* (2013.01); *C08J 2201/032* (2013.01); *C08J 2379/08* (2013.01)

(58) Field of Classification Search
CPC ............ C08J 2379/08; C08J 2201/032; B29K 2081/06; B29K 2079/085; B29K 2071/00
See application file for complete search history.

(56) References Cited

FOREIGN PATENT DOCUMENTS

| | | | |
|---|---|---|---|
| EP | 0636463 B1 * | 1/1999 | ............... B32B 5/18 |
| JP | H06 87124 A | 3/1994 | |
| JP | H11 99559 A | 4/1999 | |
| NL | 2012710 C | 4/2015 | |
| NL | 2012710 C2 * | 4/2015 | ............. B29C 44/14 |
| WO | 2006080833 A1 | 8/2006 | |
| WO | 2015014371 A1 | 2/2015 | |
| WO | 2015065175 A1 | 5/2015 | |
| WO | 2015065176 A1 | 5/2015 | |

OTHER PUBLICATIONS

International Search Report and Written Opinion for International Application PCT/NL2016/050489 dated Oct. 14, 2016, 10 pages.
International Preliminary Report on Patentability for International Application PCT/NL2016/050489 dated Jul. 18, 2017, 16 pages.

* cited by examiner

Comparative Example 2

FIG. 4

METHOD OF MANUFACTURING A SANDWICH PANEL HAVING AN ASYMMETRICAL CONFIGURATION IN THICKNESS DIRECTION

CROSS-REFERENCE TO RELATED APPLICATIONS

This application is the National Stage of International Application No. PCT/NL2016/050489, filed 7 Jul. 2016, having the title "METHOD OF MANUFACTURING A SANDWICH PANEL HAVING AN ASYMMETRICAL CONFIGURATION IN THICKNESS DIRECTION" which claims the benefit of and priority to Netherlands Application No. 2015137, filed on 10 Jul. 2015, the contents of all of which are incorporated by reference as if fully set forth herein.

TECHNICAL FIELD

The present invention relates to a method of manufacturing a sandwich panel having an asymmetrical configuration in thickness direction, comprising a foamed core part between two cover parts, according to the so-called in situ foaming technique.

BACKGROUND

EP 636463 A1 has disclosed this so called in-situ foaming technique. This known technique comprises the steps of providing a sheet of a thermoplastic material comprising an amount of a suitable physical blowing agent (a swelling agent or solvent), placing this sheet between two fibre-reinforced cover layers of a similar thermoplastic material, placing the assembly of thermoplastic core and fibre-reinforced cover layers between two heated press plates, supplying heat and pressure to the assembly and upon reaching a foaming temperature causing foaming of the thermoplastic core by increasing the spacing between the press plates, cooling the press plates when a predetermined foamed core thickness is obtained, while the sandwich panel thus obtained is kept under pressure, followed by a drying step to reduce the content of remaining physical blowing agent or solvent.

NL2012710 C has disclosed an intermediate product comprising a skin and a foamable layer, further comprising a reinforcing layer, which is embedded in the foamable layer or between the foamable layer and the skin. Upon foaming this reinforcing layer is embedded in the foamed layer or between the foamed layer and the skin.

From DE 1267416 a supporting mould for manufacturing insulating bodies or containers made of rigid plastic foam is known, wherein the form parts that are facing the insulating body to be manufactured, comprise at least partially two or more layers approximately parallel to the mould surface, which layers are made of different materials. These layers are constructed such that in the supporting mould from the inside to the outside metal heat-storing layers and heat-insulating foam layers are alternately arranged.

WO 2006080833 A1 has disclosed that during the drying step at elevated temperature of the in situ foaming technique the remaining physical blowing agent is preferably removed, while the outflow thereof via the peripheral edges of the foamed core is restricted.

The in situ foaming technique can also be used for manufacturing such sandwiches starting with a core part comprising a thermoplastic material that contains a chemical blowing agent, between cover parts, as disclosed e.g. in WO 2015065175 A1 and WO 201506176 A1.

In sandwich products having a symmetrical design in the thickness direction and obtained using said in situ foaming technique the adhesion between the cover layer(s) and the foamed core is stronger than the bonding between the cells of the foam. Thus upon excess mechanical loading along the interface between core and cover layer failure primarily occurs in the foamed core.

Now it has appeared that upon using this prior art in situ foaming technique in order to manufacture sandwiches having an asymmetrical configuration (taking the core as centre) in the thickness direction the adhesion between a (fibre-reinforced) cover layer and the foamed core may fail, and that the flatwise tensile strength is low compared to a symmetrical design having a similar density of the foamed thermoplastic core. Such asymmetrical configurations may be desired for applications wherein both planar faces of a sandwich panel serve different purposes and thus require different properties.

SUMMARY

Therefore it is an object of the invention to provide a sandwich panel having an asymmetrical configuration that does not show the above disadvantages or at least to a lesser extent. In particular the invention aims at improving the adhesion between the cover layer(s) and the foamed core in a sandwich panel having an asymmetrical configuration.

DETAILED DESCRIPTION

Accordingly, the method according to the invention of manufacturing a sandwich panel having an asymmetrical configuration in the thickness direction comprises the steps of:
a) an assembling step of providing a plate-shaped assembly of a first cover part and a second cover part and between these cover parts a core part of a thermoplastic material containing a blowing agent, wherein the second cover part is not equal to the first cover part regarding heat capacity and/or thermal conductivity;
b) a heating step of heating the assembly of step a) under pressure between press tools in a press; thereby effecting adhesion of the core part to the first and second cover parts;
c) a foaming step of foaming the thermoplastic material in the core part under pressure and at a foaming temperature between press tools in the press by increasing the spacing between the press tools;
d) a cooling step of cooling the foamed sandwich panel resulting from step c), while the sandwich panel is maintained under pressure between the press tools;
e) a discharging step of removing the thus cooled sandwich panel from the press;

wherein during step a) a first compensation part conforming to the heat capacity and thermal conductivity of the second cover part is positioned at the side of the first cover part and/or a second compensation part conforming to the heat capacity and thermal conductivity of the first cover part is positioned at the side of the second cover part, and wherein during or after step e) the first and/or second compensation parts are removed from the sandwich panel.

In the method according to the invention first a plate shaped assembly is prepared by stacking a first cover part, a core part made of a thermoplastic material containing a sufficient amount of physical blowing agent for foaming to the final thickness achieved in steps c) and d), and a second cover part, onto one another. Typically these parts will be present as sheets or films. For a continuous operation of an "endless" sandwich the plate-shaped assembly comprises webs of the thermoplastic core part and the cover parts, which are typically unwound from coils. A continuous press as disclosed in WO 2015065175 A1 and WO 201506176 A1 can be used for such continuous operation. For sake of clarity, in this specification the first cover part will sometimes be referred to as bottom cover part, while the second cover part is also indicated as top cover part. The bottom and top cover parts differ from one another regarding heat capacity and/or thermal conductivity. Typically such a difference is present when the total thickness and/or the kind of materials used in the respective cover parts are not identical, such as materials having different heat transfer coefficients and/or thermal conductivity coefficients. E.g. the first cover part contains one (fibre-reinforced) thermoplastic layer having a certain thickness, while the second cover part consist of two such (fibre-reinforced) thermoplastic layers. Another example is an assembly, wherein a metal sheet like aluminium is used for one cover part, while the opposite cover part comprises a (fibre-reinforced) thermoplastic material. The plate-shaped assembly is usually flexible and adapts to the shape of the press tools, which may be flat in order to produce flat (planar) sandwich panels. A more complex shape of the press tools such as curved or double curved in different directions, e.g. for manufacturing a roof of a car or a sidewall for an aircraft interior, is also contemplated. Typically the press tools such as flat press plates are releasably mounted in the press.

As indicated above, if such an assembly is subjected to the in situ foaming method steps comprising a foaming step, cooling step, discharging step and drying step, the mechanical properties of the resulting sandwich are insufficient, in particular the adhesion is poor.

Although not wishing to be bound by any theory, it is believed that these insufficient and inconsistent properties are caused by a difference in cooling conditions due to the asymmetrical configuration. Thereby a temperature difference occurs between the respective interfaces of the cover parts with the foamed thermoplastic core. At these interfaces, in case of a physical blowing agent (swelling agent or solvent), the concentration thereof is higher than in the centre of the thermoplastic core part during the cooling step, in particular during a fast cooling step at rates of about 100° C./min. Due to the temperature differences a flow of physical blowing agent in air occurs, which air is inevitably sucked in from the environment upon opening of the press in the foaming step, which flow causes collapsing and/or dissolving the fresh formed foam cells locally, in particular at these interfaces. As a result the adhesion between cover parts and foamed core could be poor. Also during heating to the foaming temperature a temperature difference might occur such that the time and temperature conditions to which the interface between core part containing the physical blowing agent and the respective cover part is subjected are different at both bottom and top sides, resulting in a different adhesion at both sides.

In case of a chemical blowing agent which decomposes above its decomposition temperature into gaseous decomposition products, like nitrogen, ammonia, oxygen, carbon monoxide and carbon dioxide, fast cooling from the foaming temperature (which is suitably at the melting temperature of the respective thermoplastic in the core), in particular non-homogenous cooling due to temperature differences caused by the asymmetrical design, may induce shrink stresses, in particularly at the interface of a cover part and the core part, which affect the adhesion locally.

The invention counteracts the occurrence of this temperature difference and the consequences thereof by adding one or more compensation parts to the assembly such that regarding heat capacity and thermal conductivity a more symmetrical configuration is achieved, however, without bonding of the additional compensation parts to the respective cover layers during the process. In other words, only the foamed core part adheres to the cover parts in steps b) and c). It is assumed that this kind of compensation or equalisation regarding the heat transfer properties of the cover parts in combination with the compensation parts reduces the temperature differences between the interfaces of foamed core part and cover parts during the cooling step, thereby reducing the local flow of physical blowing agent and also the generation of internal stress due to shrink upon cooling in case of a chemical blowing agent. In case of a physical blowing agent the compensation parts also allow a more homogeneous heating step, which is advantageous for equalizing the adhesion at the bottom and top cover part respectively. Thus according to the invention in step a) a first compensation part and/or second compensation part are arranged at the respective outer surfaces of the first and second cover parts.

The method according to the invention can be performed using any thermoplastic plastic material in the core part, which thermoplastic can be foamed by a blowing agent. Examples of suitable thermoplastics include polyetherimide (PEI), polyethersulfone (PES), polysulfone (PSU), polyphenylenesulphide (PPS), polyphenylsulfone (PPSU), polyketone, liquid crystal polymers, polycarbonate (PC), propylene etc. A preferred thermoplastic for use with a physical blowing agent is polyetherimide (PEI). This thermoplastic is available from Sabic JP under the tradename Ultem in different grades. Preferred materials for use in combination with a chemical blowing agent are polyolefins, in particular polyethylene and polypropylene, and crystalline (bio-)thermoplastics.

The core part contains an amount of blowing agent, that is sufficient for foaming the thermoplastic material in the core part to the desired thickness. This thickness is determined by the final distance achieved between the press tools in the foaming step c) and cooling step d). Typical examples of physical blowing agents include low boiling organic compoundsA preferred example is acetone.

Decomposition of a chemical blowing agent at a high temperature, where the viscosity or melt strength of the molten thermoplastic material of the core part is low, offers the advantage that the gaseous decomposition products are distributed well throughout the core part prior to foaming. Extruded films of the thermoplastic material of the core part having a sufficient amount of chemical blowing agent can be extruded just above the melting temperature or range of the thermoplastic in question and below the starting temperature of decomposing the chemical blowing agent. This starting temperature of the decomposition of the chemical blowing agent is often within 10-20% of the melting temperature or range of the thermoplastic material. Thus efficient decomposition of the chemical blowing agent within tens of seconds may be performed at a temperature of 25-35% above the melting temperature or range of the first thermoplastic.

For example, commercially available (isotactic) propylene has a melting point (determined by differential scanning calorimetry) in the range of 160-171° C., depending on the amount of atactic PP present and crystallinity. The chemical blowing agent azodicarbonamide, depending on the particle size of the powder, generally starts to decompose above 170° C., while thermal decomposition in the invention is advantageously carried out at a considerably higher temperature as indicated above, such as above 200° C.

Other examples of chemical blowing agents include azobisisobutyronitrile, diazoaminobenzene, mononatriumcitrate and oxybis(p-benzenesulfonyl)hydrazide. Azo-, hydrazine and other nitrogen based chemical blowing agents are preferred. Azodicarbonamide is a preferred example of this category. Still other examples include isocyanate for PU and sodium bicarbonate.

The cover parts can be suitably selected from sheets of thermoplastic material, metals and combinations thereof. Suitably the thermoplastic material, if any, of a cover part is the same as the thermoplastic material of the thermoplastic core part. Suitable thermoplastic materials—in case of a physical blowing agent in the thermoplastic core part— include polyethersulfone (PES), polyphenylsulfone (PPSU) and polysulfone (PSU), in particular polyetherimide (PEI) in view of their favourable flame retarding properties. However, combinations of different thermoplastics are also contemplated. Suitable examples thereof comprise inter alia PEI core part between cover parts, wherein at least one of the cover parts is made from PS or PC, and a PES core part and at least one PC cover part. In case of a chemical blowing agent contained in the thermoplastic core part the thermoplastic, if any, in a cover part is typically the same as the thermoplastic in the core part. Aluminium is a preferred metal for a cover part in view of weight. In view of weight and strength in an advantageous embodiment at least one of the first and second cover part comprises one or more layers of a fibre-reinforced thermoplastic.

Here it is noted, that in an embodiment of a physical blowing agent contained in the thermoplastic core part and a cover part comprising multiple sublayers of (fibre-reinforced) thermoplastic material, typically these layers are consolidated (that is to say subjected to a heat treatment above the glass transition temperature) in a pressurized condition) prior to step a), such that the (fibre-reinforced) thermoplastic sublayers are irreversibly adhered to one another and form a single integral cover part. This consolidation step is necessary as during the foaming step no bonding would occur between these layers, as basically the foaming step is performed at a foaming temperature below the glass transition temperature of the thermoplastic material in the cover part(s) and additionally the physical blowing agent cannot diffuse from the core part through an adjacent layer onto the interface between the layers of the cover part.

Contrary in case of a chemical blowing agent having a decomposition temperature above the melting point or range of the thermoplastic material in the core part and the thermoplastic material in the cover parts, prior consolidation of multiple separate layers in order to prepare a single consolidated cover part is not necessary. In such a case in heating step b) the temperature is raised above the decomposition temperature of the chemical blowing agent, so that also consolidating of the multiple thermoplastic layers in a cover part will occur.

Glass fibres are a preferred example of reinforcement, if present in a cover part. However other inorganic fibres, such as metal fibres, carbon fibres and organic fibres like aramid fibres, can be applied. In addition to the above synthetic fibres natural fibres can also be used. The fibres in the reinforcement of a cover part may optionally be oriented, and there are no restrictions whatsoever on the length and orientation. Knitted fabrics, woven fabrics, mats, cloths and unidirectional fibres represent various manifestations thereof.

The foaming step, cooling step and drying step are performed under conditions similar to those disclosed in the above mentioned state of the art documents, depending on the starting materials including the type of blowing agent and dimensions.

In the foaming step a closed cell foam is formed, typically an anisotropic foam with elongate cells that are oriented in the height direction (that is to say the largest dimension of the cells extend in a direction from one cover part to the other cover part).

Typically the process according to the invention is adapted to the kind of blowing agent used.

Provided that the blowing agent in the thermoplastic material of a core part is a physical blowing agent, then in step b) the assembly is heated to the foaming temperature below the glass transition temperature of the thermoplastic material in the core part, and after step e) a drying step f) of drying the obtained sandwich panels is carried out.

Provided that the blowing agent in the thermoplastic material of a core part is a chemical blowing agent having a decomposition temperature above the melting point or range of the thermoplastic in the core part, then in step b) the assembly is heated to a temperature above the decomposition temperature of the chemical blowing agent, such that decomposition occurs, and preferably subsequently the assembly—still under pressure—is cooled to the foaming temperature typically above or at the melting temperature (range or point) of the thermoplastic in the core part. Thereafter the foaming step and cooling step are carried out as explained. Foaming at the decomposition temperature, thus far above the melting point or range of the thermoplastic in question, is possible, but due to the low viscosity might result in relatively weak cells of the foamed core part.

Typically the pressure during the heating step, foaming step and cooling step is in the range of 3-5 MPa. Higher pressures are also contemplated. In foaming step c) the assembly with added compensation part(s) is arranged in the press, which is preferably preheated. Upon heating the press the temperature of the assembly (based on physical blowing agent) and added compensation part(s) reaches the foaming temperature (e.g. 175-182° C. for a PEI core part). During heating the assembly is held between the heated press tools in a pressurized condition in order to prevent premature expansion of the core part and simultaneously generate bonding of the core part to be foamed to the cover parts. Thereafter the distance between the press plates is increased. In cooling step c) the foamed assembly, while kept in the press under pressure (usually essentially the same pressure as during foaming) is cooled down to ambient temperature. After unloading the thus obtained sandwich panel from the press and removing the compensation part(s), the sandwich panel, if based on a physical blowing agent, is subjected to a drying treatment in order to reduce the content of physical blowing agent. This drying treatment is preferably carried out by increasing the temperature in intervals up to a temperature in the range of about 150° C. to about the glass transition temperature of the foamed core thermoplastic. For PEI the Tg is 217° C. The temperature increase between intervals is usually about 10 degrees. The sandwich panel is maintained at each intermediate temperature for a sufficient period of time, for example two hours. Advantageously the drying step e) is initiated within 10-12 hours after the end of the foaming step b). If at least one of the cover parts comprises a thermoplastic material the drying is preferably carried out as disclosed in WO 2006/080833 A1. In case of a chemical blowing agent in a thermoplastic olefin like polyethylene or polypropylene a drying step is not necessary.

The sandwich panels obtained using the method according to the invention can be further processed, for example shaping to the desired final shape by edge finishing. The sandwich panels made in accordance with the present invention are advantageously used in light weight applications where fireproof properties and/or sufficient strength/stiffness are required. A preferred application area is the transport sector, including automotive, in particular the air- and spacecraft industry.

In a straightforward embodiment of the invention the first compensation part is identical to the second cover part and/or the second compensation part is identical to the first cover part. This embodiment is particularly advantageous, if the first and second cover parts of the assembly consists of different materials, e.g. a metal sheet at one side and one or more (consolidated or not, depending on the nature of the blowing agent as explained above) sheets of a fibre-reinforced thermoplastic material at the opposite side. Then according to this preferred embodiment the same number of sheets of fibre-reinforced thermoplastic, but not consolidated, is arranged beneath the metal cover part in the respective press tool, and on top of the other cover part the same metal sheet is arranged.

If in an embodiment of a chemical blowing agent, a cover part comprises the same thermoplastic as in the core, then there is a risk that the compensation part(s) which is/are also made from a thermoplastic material will adhere to the cover part. Such an undesired adhesion can be counteracted by providing a temperature resistant separating sheet or film, such as a Teflon sheet, between the outer surface of the cover part that comprises a (fibre-reinforced) cover layer and the compensation part. In order to restore the heat balance in general a similar separating sheet or film is added to the other side.

In another preferred embodiment the first cover part comprises a first number of layers, that may be consolidated to an integral part in case of a physical blowing agent, of a thermoplastic material, preferably fibre-reinforced thermoplastic material, and the second cover part comprises a second but different number of layers, that where required is consolidated to an integral part, of the same (fibre-reinforced) thermoplastic material. Thus the total thickness or total number of reinforcements differs. In such a situation, where only the thickness is different it is usually sufficient to only have a compensation part at one cover part to make up the same total thickness on both sides. This compensation part consists of the difference in number of original layers in the cover part.

In a preferred embodiment of the method according to the invention using a physical blowing agent in the thermoplastic core part of the starting assembly the cooling step d) comprises two substeps d1) and d2). In the first substep d1) the foamed assembly and added compensation part(s) is subjected to a first cooling treatment from the foaming temperature to an intermediate temperature at a first cooling rate, while in the second substep d2) the foamed assembly and added compensation part(s) is subjected to a second cooling treatment from the intermediate temperature to ambient temperature at a second cooling rate, wherein the second cooling rate is less than the first cooling rate. Typically the intermediate temperature is in a range of the half of the foaming temperature ±10-20° C. E.g. a PEI foamed core based sandwich panel is cooled in a first substep from the foaming temperature of about 180° C. to an intermediate temperature of 90° C. within 40 seconds, preferably within 15-25 seconds. In the second substep the sandwich panel is cooled to room temperature at a cooling rate of about at most half the first cooling rate of the first substep, preferably less than 20° C./min. Such a multistep cooling treatment has appeared to be favourable in view of adhesion When the starting assembly comprises a chemical blowing agent a single high cooling rate suffices.

EXAMPLES

The invention is further illustrated by means of the following Examples.

Example 1 (According to Prior Art)

First and second cover parts: each one layer US-style 7781 glass fabric PEI (polyetherimide) impregnated and consolidated with 33+−2% PEI, layer thickness=0.23 mm.

Thermoplastic core part: two films of PEI, (Polyetherimide) Ultem 1000, impregnated with 12.1-12.9 wt. % acetone, film thickness in the range of 250-300 micrometres.

The percentage of acetone in the film is determined as ((weight of film+acetone in g) minus (weight of the neat film in g)) divided by (weight of the neat film in g).

Several FITS panels (planar dimensions 50×30 cm) were manufactured with the following configuration:

A symmetrical stack was assembled with two acetone impregnated PEI films as core part between the identical first and second cover parts. This assembly was placed between the heated press plates of the press. After closing the press the assembly was heated in seconds to the required foaming temperature of 178-180° C. The centre of the temperature measuring device (Pt element type K) is located 4 mm below the surface of the press plates. Pressure is 4 MPa. Upon reaching this foaming temperature the press—while maintaining pressure at essentially the same value—was opened according to a certain foaming curve to a predetermined thickness (as specified below) of the final sandwich panel, after which the press plates and consequently the thermoplastic sandwich panel were cooled from the foaming temperature to 90° C. in 20 seconds, and further down to a temperature below 60° C. at a rate of less than 10° C./sec. Subsequently the obtained sandwich panels were dried according to WO2006080833 A1 by taping the edges to reduce peripheral outflow of acetone and direct it through the cover parts using temperature increases of 10° C. between intervals of 2-4 hours at a given temperature.

In this way sandwich panels with thicknesses of 9.5 and 7.5 mm were manufactured. The sandwich panels were tested for the adhesion between the fibre-reinforced thermoplastic PEI cover parts and the in-situ foamed PEI core part using a flatwise tensile strength test procedure according to ASTM C297.

The 9.5 mm in-situ foamed thermoplastic sandwich panel having a foam density (obtained from 2 acetone impregnated PEI films having a thickness of 300 micrometres each) of 85 kg/m³ showed an average flatwise tensile strength of 3.4 MPa. The 7.5 mm in-situ foamed thermoplastic sandwich panel having a foam density (obtained from 2 acetone impregnated PEI films having a thickness of 250 micrometres each) of 90 kg/m³ has an average flatwise tensile strength of 3.9 MPa.

Typically, failure of the test samples occurred in the thermoplastic core part, indicating that the adhesion between the core part and cover parts is adequate. The cover parts could not be peeled manually from the foam core.

Example 2 (Comparative)

First cover part: one layer US-style 7781 glass fabric PEI (polyetherimide) impregnated and consolidated with 33+−2% PEI, layer thickness=0.23 mm.

Second cover layer: one integral part originally consisting of two layers US-style 7781 glass fabric impregnated with 33+−2% PEI, which were consolidated; total thickness=0.46 mm;

Thermoplastic core part: two films of PEI, (Polyetherimide) Ultem 1000, impregnated with 12.1-12.9 wt. % acetone, film thickness in the range of 200-300 micrometres.

An asymmetrical assembly was prepared from the thermoplastic core part in between the first and second cover part. This assembly was subjected to in situ foaming as outlined in EXAMPLE 1 using the same conditions.

Sandwich panels (25×25 cm) having a thickness of 9.75 mm starting from two acetone impregnated PEI films having a thickness of 300 micrometres each, respectively 7.75 mm starting from two acetone impregnated PEI films having a thickness of 250 micrometres each) were obtained. The 9.5 mm in-situ foamed thermoplastic sandwich panel having a foam density of 85 kg/m³ showed an average flatwise tensile strength of 1.5 MPa. The 7.5 mm in-situ foamed thermoplastic sandwich panel having a foam density of 90 kg/m³ has an average flatwise tensile strength of 2.0 MPa.

Failure of the test samples occurred at the interface between the fibre-reinforced thermoplastic cover part and the in situ foamed core part, indicating that the adhesion at the interfaces was less than the strength of the foam. Also the cover parts could be peeled manually of the foam core part rather easily.

Example 3 (According to the Invention)

EXAMPLE 2 was repeated, except that a compensation part consisting of one additional layer US-style 7781 glass fabric PEI (polyetherimide) impregnated and consolidated with 33+−2% PEI, layer thickness=0.23 mm, was arranged at the first cover part: Thus a symmetrical stack based on an asymmetrical assembly and the compensation part is subjected to the in situ foaming method.

First cover part: one layer US-style 7781 glass fabric PEI (polyetherimide) impregnated and consolidated with 33+−2% PEI, layer thickness=0.23 mm.

Second cover layer: one integral part originally consisting of two layers US-style 7781 glass fabric impregnated with 33+−2% PEI, which were consolidated; total thickness=0.46 mm;

Thermoplastic core part: two films of PEI, (Polyetherimide) Ultem 1000, impregnated with 12.1-12.9 wt. % acetone, film thickness in the range of 200-300 micrometres.

First compensation part: one layer US-style 7781 glass fabric PEI (polyetherimide) impregnated and consolidated with 33+−2% PEI, layer thickness=0.23 mm Sandwich panels (25×25 cm) having a thickness of 9.75 mm starting from two acetone impregnated PEI films having a thickness of 300 micrometres each, respectively 7.75 mm starting from two acetone impregnated PEI films having a thickness of 250 micrometres each were obtained. The 9.5 mm in-situ foamed thermoplastic sandwich panel having a foam density of 85 kg/m³ showed an average flatwise tensile strength of 3.4 MPa. The 7.5 mm in-situ foamed thermoplastic sandwich panel having a foam density of 90 kg/m³ has an average flatwise tensile strength of 3.9 MPa.

Failure of the test samples occurred in the foamed core. The cover parts could not be peeled manually from the foam core.

Example 4

Figure 1:
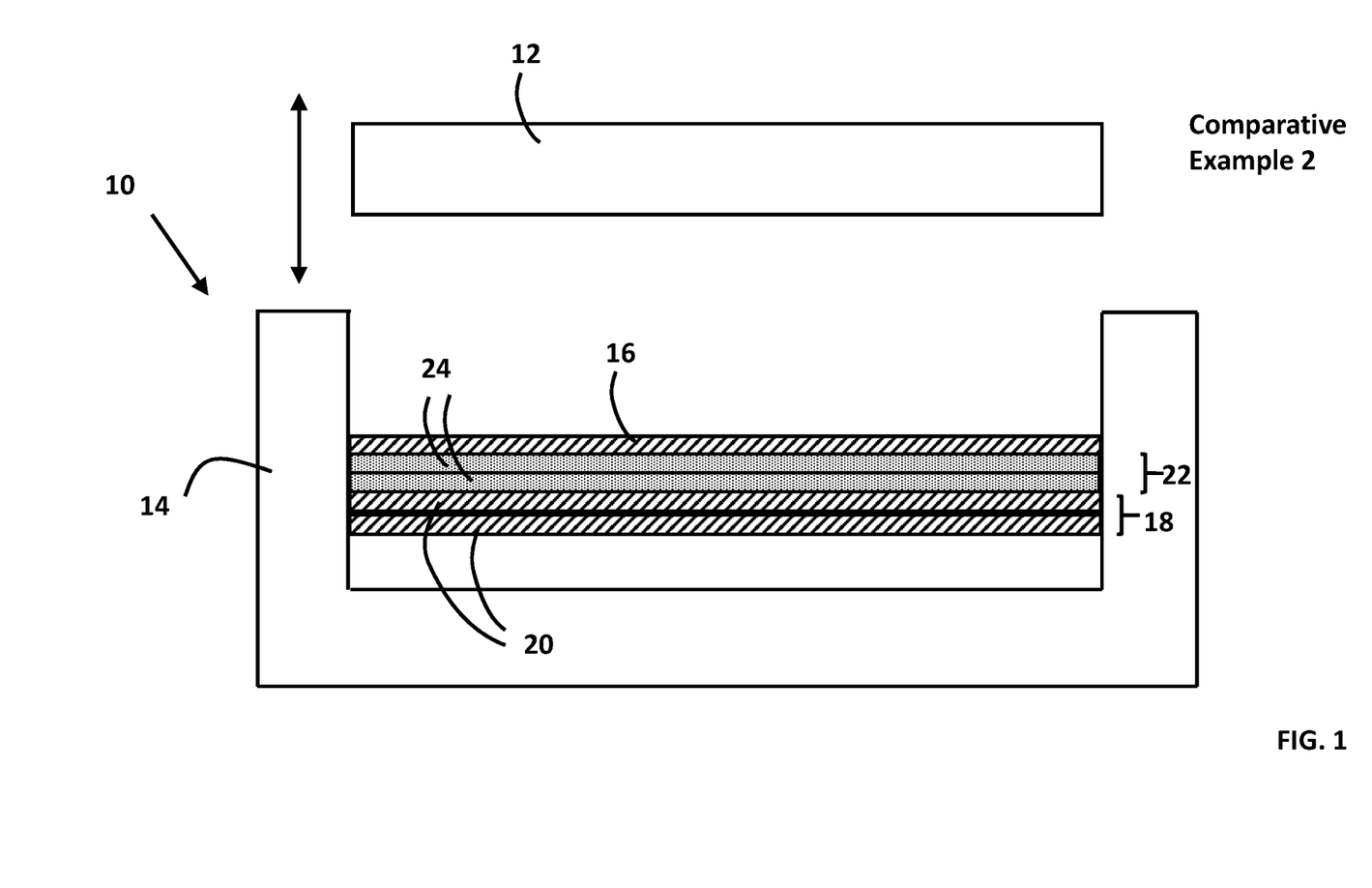
FIG. 1 illustrates the embodiment of the method of Example 2 (comparative)
Figure 2:
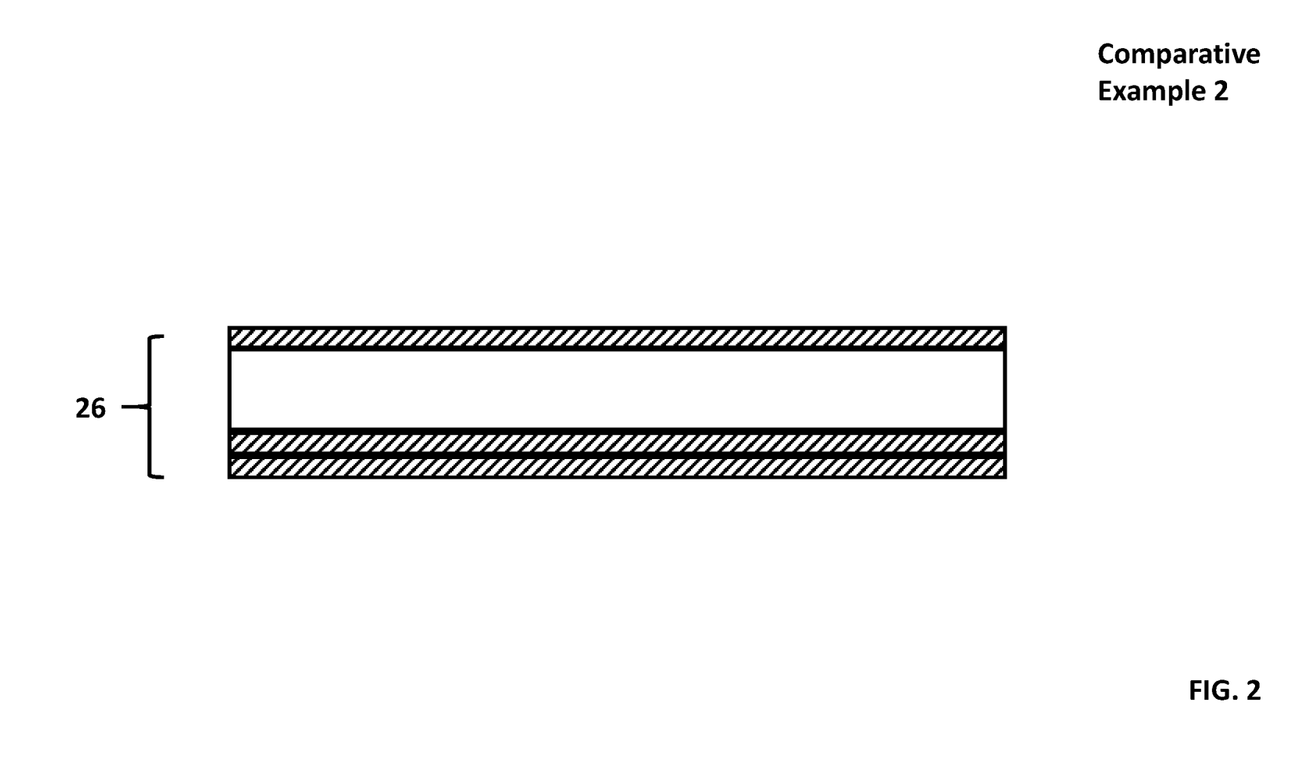
FIG. 2 shows the sandwich panel manufactured according to FIG. 1.

In FIG. 1 a press, indicated in its entirety by reference numeral 10, comprises a first press tool 12 and a second press tool 14. An assembly consisting of a first cover part 16 of a consolidated single layer of glass fabric reinforced PEI and an integral second cover part 18 consisting of two consolidated layers 20 of glass fabric reinforced PEI and an intermediate core part 22 of two films 24 of PEI impregnated with blowing agent was positioned in the press 10 and subjected to the process described in Example 2. The resulting sandwich panel 26 is shown in FIG. 2.

Figure 3:
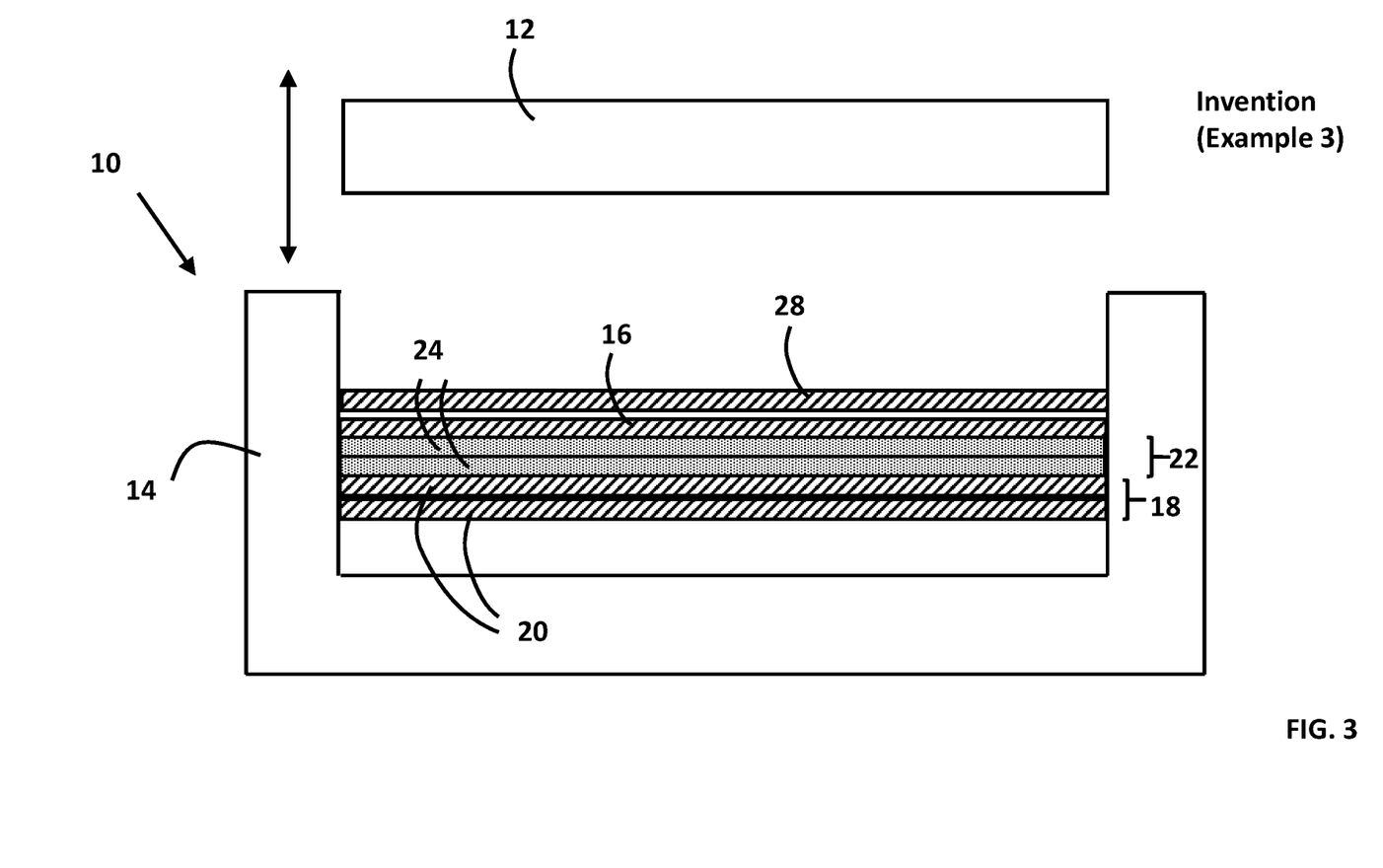
FIG. 3 illustrates an embodiment of the method according to the invention, as described in Example 3 (according to the invention)
Figure 4:
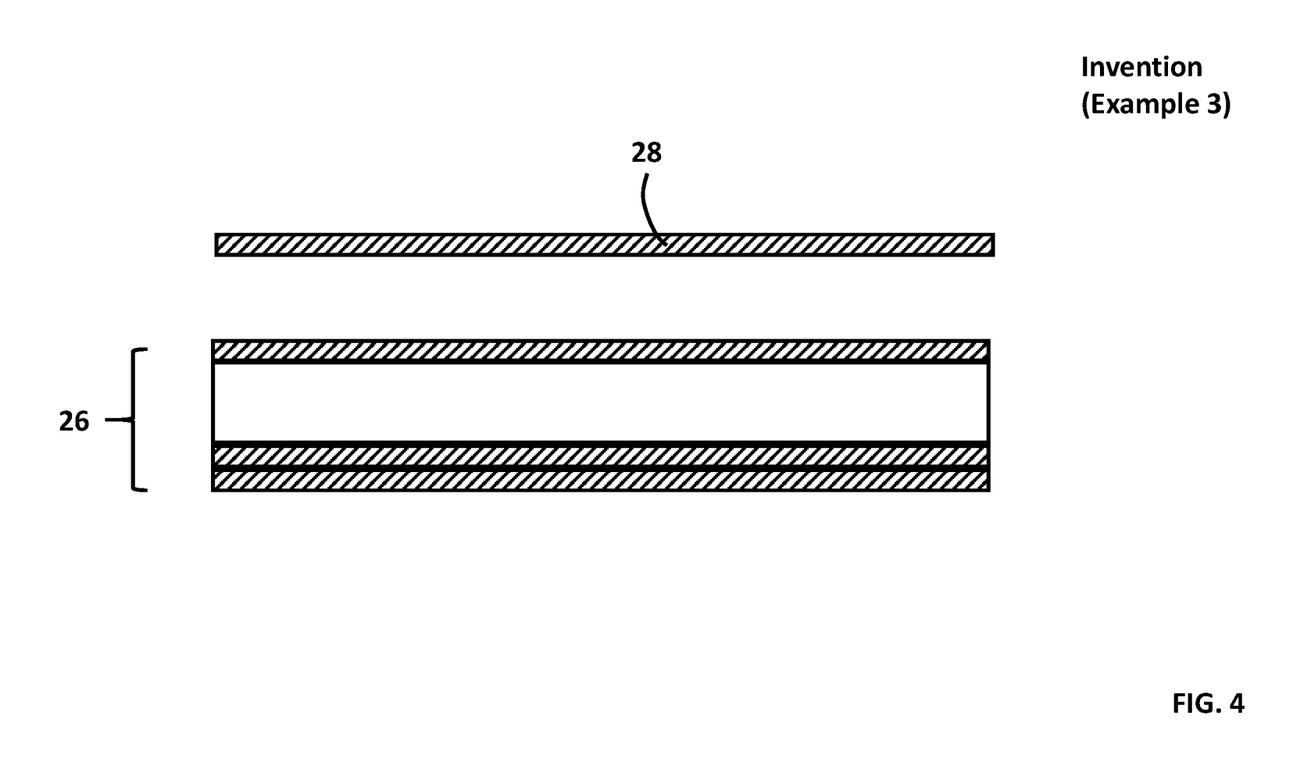
FIG. 4 shows the sandwich panel manufactured according to FIG. 3.

FIG. 3 illustrates the embodiment of the method according to the invention as described in Example 3. In the press 10, comprising a first press tool 12 and a second press tool 14, an assembly consisting of a first cover part 16 of a consolidated single layer of glass fabric reinforced PEI and an integrated second cover part 18 consisting of two consolidated layers 20 of glass fabric reinforced PEI and an intermediate core part 22 of two films 24 of PEI impregnated with blowing agent was positioned in the press 10. The greater thickness of the second cover part 18 is balanced by positioning a compensation part 28 consisting of a consolidated single layer of glass fabric reinforced PEI on top of the first cover part 16. The stack of assembly 14 and the compensation part 28 was subjected to the process described in Example 3. The resulting sandwich panel 26 and non-adhered compensation part 28 are shown in FIG. 4.

The invention claimed is:
1. Method of manufacturing a sandwich panel having an asymmetrical configuration in the thickness direction, comprising the steps of:
   a) an assembling step of providing a plate-shaped assembly of a first cover part and a second cover part and between these cover parts a core part of a thermoplastic material containing a blowing agent, wherein the second cover part is not equal to the first cover part regarding heat capacity and/or thermal conductivity;
   b) a heating step of heating the assembly of step a) under pressure between a first press tool and a second press tool in a press; thereby effecting adhesion of the core part to the first and second cover parts;
   c) a foaming step of foaming the thermoplastic material in the core part under pressure and at a foaming temperature between the press tools in the press by increasing the spacing between the press tools;
   d) a cooling step of cooling the foamed sandwich panel resulting from step c), while the sandwich panel is maintained under pressure between the press tools;

e) a discharging step of removing the thus cooled sandwich panel from the press;

wherein during step a) a first compensation part conforming to the heat capacity and thermal conductivity of the second cover part is positioned at the side of the first cover part and/or a second compensation part conforming to the heat capacity and thermal conductivity of the first cover part is positioned at the side of the second cover part, and wherein during or after step e) the first and/or second compensation parts are removed from the sandwich panel.

2. Method according to claim 1, wherein the first compensation part is identical to the second cover part and/or the second compensation part is identical to the first cover part.

3. Method according to claim 1, wherein the blowing agent in the thermoplastic material of the core part is a physical blowing agent, wherein in step b) the assembly is heated to a foaming temperature below the glass transition temperature of the thermoplastic material in the core part, and wherein a drying step f) of drying the obtained cooled sandwich panel is carried out after step e).

4. Method according to claim 1, wherein at least one of the first and second cover parts comprises a layer of the thermoplastic material.

5. Method according to claim 1, wherein the thermoplastic material of a cover part is equal to the thermoplastic material of the core part.

6. Method according to claim 4, wherein the thermoplastic material of a cover part is selected from the group consisting of polyetherimide (PEI), polyethersulfon (PES), polyphenylsulfone (PPSU) and polysulfone (PSU).

7. Method according to claim 1, wherein the first cover part comprises one or more consolidated layers of a fibre-reinforced thermoplastic material and the second cover part comprises a metal layer.

8. Method according to claim 1, wherein the first cover part comprises one or more consolidated layers of a fibre-reinforced thermoplastic material and the second cover part comprises a different number of consolidated layers of the same fibre-reinforced thermoplastic material.

9. Method according to claim 3, wherein the physical blowing agent is acetone.

10. Method according to claim 1, wherein in step c) cooling is carried out in two substeps, comprising: a first substep c1) of cooling the foamed assembly from the foaming temperature to an intermediate temperature in the range of 70-100° C. at a first cooling rate and a second substep c2) of cooling the foamed assembly from the intermediate temperature to ambient temperature at a second cooling rate, wherein the first cooling rate is larger than the second cooling rate.

11. Method according to claim 1, wherein the blowing agent is a chemical blowing agent having a decomposition temperature above the melting point or range of the thermoplastic material of the core part, wherein in step b) heating is carried out to a temperature above the decomposition temperature of the chemical blowing agent such that decomposing of the chemical blowing agent occurs, and subsequently cooling is carried out to a foaming temperature above the melting temperature of the thermoplastic material in the core part.

12. Method according to claim 11, wherein at least one of the first and second cover parts comprises a layer of a thermoplastic material, and wherein in step a) a temperature resistant separating layer is positioned between each cover part that comprises a thermoplastic material, and the associated compensation part, and wherein at each side of the assembly such a separating layer is present.

13. Method according to claim 11, wherein the thermoplastic material of a cover part is equal to the thermoplastic material of the core part.

14. Method according to claim 11, wherein the thermoplastic of the core part is selected from crystalline thermoplastic materials.

15. Method according to claim 11, wherein the thermoplastic material of the core part is selected from polyolefines.

16. Method according to claim 11, wherein the first cover part comprises one or more consolidated layers of a fibre-reinforced thermoplastic material and the second cover part comprises a metal layer.

17. Method according to claim 11, wherein the first cover part comprises one or more consolidated layers of a fibre-reinforced thermoplastic material and the second cover part comprises a different number of consolidated layers of the same fibre-reinforced thermoplastic material.

18. Method according to claim 4, wherein at least one of the first and second cover parts comprises a layer of a fibre-reinforced thermoplastic material.

19. Method according to claim 12, wherein at least one of the first and second cover parts comprises a layer of a fibre-reinforced thermoplastic material.

20. Method according to claim 19, wherein in step a) a temperature resistant separating layer is positioned between each cover part that comprises a fibre-reinforced thermoplastic material.

21. Method according to claim 15, wherein the thermoplastic material of the core part is polyethylene or polypropylene.

* * * * *